H. BAKER.
Hay Loader.
No. 2,911. Reissued April 7, 1868.
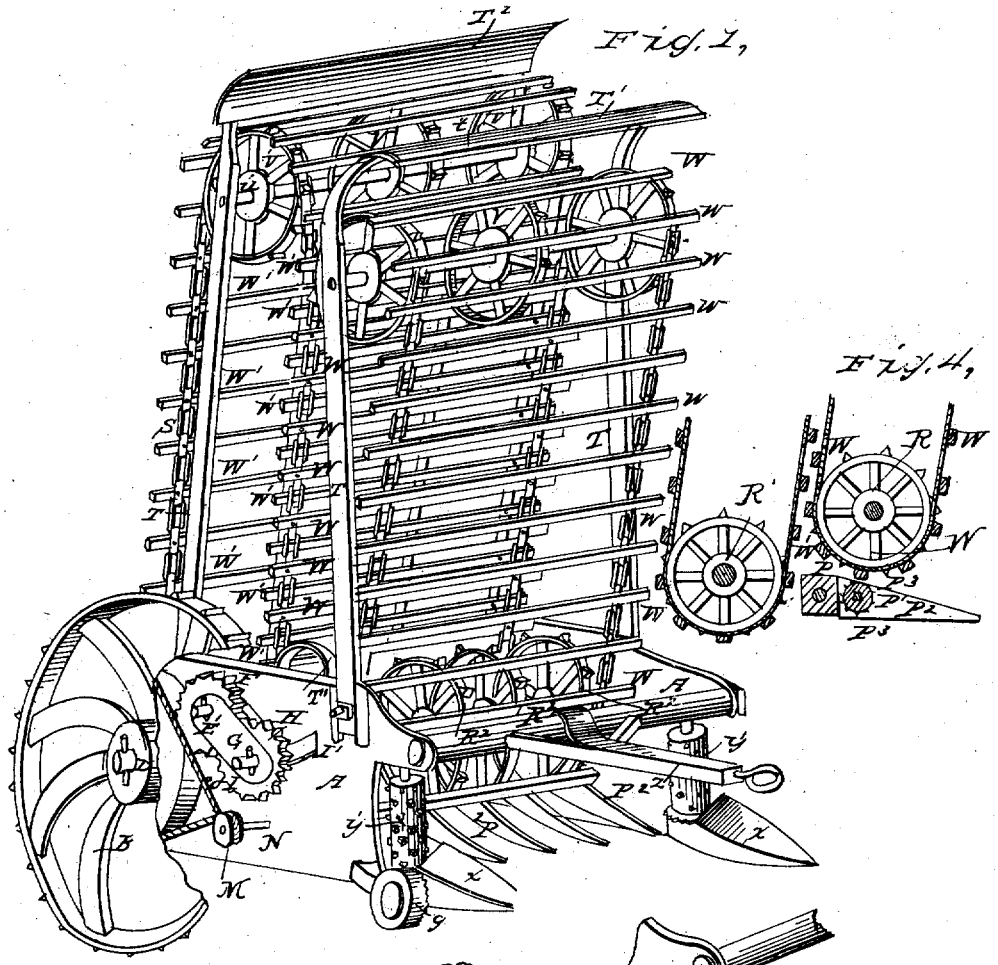
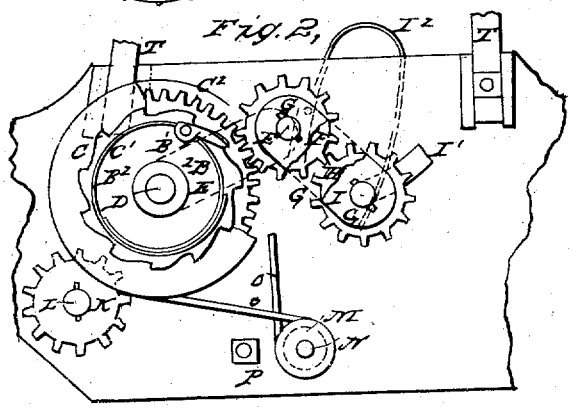
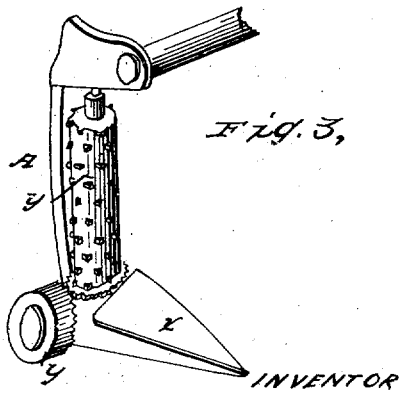
WITNESSES:
T. A. Cudlip
J. F. Bangem
INVENTOR
Horace Baker
by D. P. Holloway & Co
his atty
N. PETERS, Photo-Lithographer, Washington, D. C.

United States Patent Office.

HORACE BAKER, OF CORTLAND, NEW YORK.

*Letters Patent No.* 55,979, *dated July* 3, 1866; *reissue No.* 2,911, *dated April* 7, 1868.

IMPROVEMENT IN HAY-RAKERS AND LOADERS.

The Schedule referred to in these Letters Patent and making part of the same.

TO ALL WHOM IT MAY CONCERN:

Be it known that I, HORACE BAKER, of Cortland, in the county of Cortland, and State of New York, have invented a new and useful Machine for Loading Hay; and I do hereby declare that the following is a full, clear, and exact description of the same, reference being had to the drawings already on file in the Patent Office, and made a part of this specification, in which—

Figure 1 is a perspective view.

Figure 2 is a side elevation, showing the box and gearing.

Figure 3 is a detached view of front rollers.

Figure 4 is a section showing the relative position of the horizontal rollers, pulley, and apron.

My invention relates to machines for gathering the cut grass and raising it from the ground and loading it upon a wagon. The machine is hitched to the hind end of the wagon, and follows close to the end of the hay-rake, upon which the hay falls as it is raised by the machine.

The construction of the apparatus will appear from the following description:

A A are the sides of the main frame, to which the machinery is attached. B, the driving-wheels, are attached to fixed axles, projecting from and secured to the sides A. On the inner face of the hub of the wheels is a flange, represented as in section, in fig. 2, and marked $B^2$. The rest of the wheel is not shown in this figure, with the exception of the pawl B, which is pivoted to the hub of the wheel, and pressed outward by the coiled spring $B^3$, attached to the flange $B^2$. On the axle D also revolves the cup-formed wheel C, which has an internal ratchet cut on the inner face of its externally-projecting flange, in such manner that the pawl shall press against and carry this wheel with it when the driving-wheel B is turning forward, but when the driving-wheel is turning backward, the pawl slipping over the inclined faces of the ratchet, the wheel C will not move. The flange *c* is finished on the exterior face nearest the rim, as a pulley, to receive the belt O, and on the opposite side, on the portion forming the end or solid part of the wheel, is placed the spur-gearing $c^2$.

Between the wheel C and side A, there are also attached to the boxes D straps E, which turn on the axle freely, and have a wrist-pin, E′, projecting from the other end, parallel with the main axle, and sustaining the spur-wheel F, meshing into the spur-wheel $C^2$ on one side, and on the other into the twin spur-wheel H, which revolves upon the projecting end of the shaft I. This shaft is attached to the wrist E′ by straps G on each side of the twin spur-wheels. These straps fit loosely upon their respective bearings. The shaft I passes through I′ in the side A, and the straps G and E allow a free play to the shaft I, forward and back, without deranging the gearing, for purposes which will be hereafter explained.

Opposite the spur-wheels F G, the spur-wheel K is also geared into the spur-wheel $C^2$, communicating motion to the shaft L. The spur-wheels F, H, and K, are all of the same size.

The two sides of the machine are finished in the same manner.

The shafts I and L pass through the sides A, and across the machine, the shaft I having a play backward and forward in the slot, as described.

On each of the shafts I and L are pulleys, R R′, having pyramidal projections from their rims, working into the open links of the four endless chains S S′. Intermediate wheels, $R^2$, of the same size as the pulley-wheels, are placed upon the shafts I and L, between the pulleys, and having projections or teeth upon their outer rims. T T′ are four wooden standards, made as small as consistent with the required strength, so as to afford in them the necessary elasticity required for keeping the aprons face to face, and at the same time to increase or decrease the space between the aprons, as larger or smaller quantities of grass pass through. They are attached to the sides A, and stayed by lugs, cast on the sides, as represented. They are bent at their upper ends, and receive the two cross-guide boards, *t t*, for directing the hay on to the wagon. Across the standards, immediately below the curves in them, are attached the countershafts *u u′*, journalled upon the front and rear standards respectively. On these shafts are pulleys, *v v′*, corresponding to the pulleys R $R^2$. The endless chains, S S′, pass over these pulleys also, the open links meshing upon projections thereon. Bars W W′ are attached to the endless chains respectively, forming two elastic endless aprons.

The raking-apparatus shown in fig. 3 is found unnecessary in practice, and I therefore do not describe the same, or make any claim thereon.

In operating this machine, it is attached to the hind end of the wagon. The endless aprons work near to the ground, the rear one much the closer to the ground, the forward one high enough to pass over the hay. The projections or teeth upon the wheels $R^2$ on the shafts I and L, between the wheels R R, pick up the hay and direct it between the aprons, and as they revolve in opposite directions and close together, the hay is carried upwards between them until it strikes the guide-boards, and is by them directed forward on to the wagon. The shaft which carries the forward apron playing in the slot I′, is pressed forward when a larger quantity of hay passes in, but as such quantity decreases, the shaft I is pressed backward by the bow-spring $I^2$. The elasticity of the standards T T acts correspondingly upon the upper portions of the aprons, the space between the aprons being thus governed by the quantity of hay passing between them; and also such space may be expanded or contracted at either end independently of the other, so that a large quantity of hay may be being carried at one point, and a small quantity at another.

What I claim, and desire to secure by Letters Patent, is—

1. The two positively-actuated endless aprons, revolving in opposite directions, in combination with the toothed wheels $R^2$, or their equivalents, upon the shafts I and L, and so placed relatively that the hay may be picked by such toothed wheels, and directed between the aprons, and by them elevated, substantially as and for the purpose set forth.

2. I claim the standards T T, when so constructed that by their elasticity they shall maintain the upper portions of said aprons face to face, and permit variations in the quantity of hay carried between them, as set forth.

3. In combination with said endless aprons, I claim the guide-boards, so constructed as to pass the hay over the forward apron and on to the wagon.

4. In combination with said endless aprons, I claim the spur-wheels F and H, and the shaft I operating in the slot $I^1$, and so constructed as to allow of a forward and backward movement of such shaft and forward apron, substantially as and for the purpose set forth.

HORACE BAKER.

Witnesses:
CHAS. FOSTER,
C. P. WALRAD.